United States Patent
Waite et al.

(10) Patent No.: US 7,341,655 B2
(45) Date of Patent: Mar. 11, 2008

(54) PROCESS FOR IMPROVING AN ELECTRODE

(75) Inventors: Michael Waite, Gloucestershire (GB); Philip Tucker, Gloucestershire (GB); Brian Hayden, Hampshire (GB)

(73) Assignee: Ionex Limited, Gloucestershire (GB)

(*) Notice: Subject to any disclaimer, the term of this patent is extended or adjusted under 35 U.S.C. 154(b) by 657 days.

(21) Appl. No.: 10/333,253

(22) PCT Filed: Jul. 18, 2001

(86) PCT No.: PCT/GB01/03213

§ 371 (c)(1),
(2), (4) Date: Jul. 18, 2003

(87) PCT Pub. No.: WO02/06564

PCT Pub. Date: Jan. 24, 2002

(65) Prior Publication Data

US 2004/0020790 A1    Feb. 5, 2004

(51) Int. Cl.
    *C02F 1/46*  (2006.01)
(52) U.S. Cl. .................................. 205/704; 205/710
(58) Field of Classification Search .............. 205/57, 205/704, 710
    See application file for complete search history.

(56) References Cited

U.S. PATENT DOCUMENTS

| | | | |
|---|---|---|---|
| 3,715,238 A | 2/1973 | Mayell | |
| 4,312,720 A * | 1/1982 | Lefevre | 205/516 |
| 5,034,110 A | 7/1991 | Glore et al. | |
| 5,614,078 A | 3/1997 | Lubin et al. | |
| 5,753,101 A | 5/1998 | Ludwig | |
| 5,827,417 A | 10/1998 | Porter et al. | |

FOREIGN PATENT DOCUMENTS

| | | |
|---|---|---|
| FR | 2273277 | 5/1975 |
| GB | 2305439 | 4/1997 |
| JP | 5-51782 | 3/1993 |
| JP | 7109101 | 4/1995 |
| JP | 7300697 | 11/1995 |

OTHER PUBLICATIONS

Chialvo, A. C., "The Active Surface Area Increase Of Rhodium Electrodes Through Electroreduction Of Oxide Layers Produced By Fast Periodic Potentials," J. Electroanal. Chem., 237(1987) 237-250.

* cited by examiner

*Primary Examiner*—Arun S. Phasge
(74) *Attorney, Agent, or Firm*—Hunton & Williams

(57) ABSTRACT

A process for increasing the active surface area of at least one electrode having a surface comprising a group VIII metal in an electrochemical cell, which also comprises at least one balancing electrode and an aqueous electrolyte which comprises nitrate ions, which comprises applying a sweeping voltage across the electrodes at a rate of at least 0.2 V/s, the sweeping voltage being from a lower voltage which is between the voltage at which hydrogen evolution occurs and −0.7 V to an upper voltage which is between −0.2 V and +0.3 V, all of the above voltages being with reference to a standard calomel reference electrode (VSCE).

14 Claims, 2 Drawing Sheets

PROCESS FOR IMPROVING AN ELECTRODE

The present invention relates to a process for increasing the active surface area of an electrode having a surface comprising a group VIII metal.

It is known to use electrodes in various industrial and small-scale processes, such as in the electrolysis of dilute sodium chloride solutions to produce sodium hypochlorate for sterilization of a water supply and sewage, and in the electrolysis of ground or surface water to remove and destroy nitrate ions.

A problem associated with these processes and apparatus is maintaining the activity of the electrodes by minimising corrosion effects and the poisoning of the electrode surface. This problem can be reduced by processes involving the surface activation of the electrodes, by increasing the active surface area of the electrode, and subsequent regeneration of the electrode surface. This helps to improve the electrical efficiency of the electrode, thereby making the process more cost-effective.

U.S. Pat. No. 4,770,949 discloses a method for the surface activation of amorphous alloy electrodes, which comprise at least one of niobium, tantalum, titanium and zirconium, and at least one of ruthenium, rhodium, palladium, iridium and platinum, the balance being nickel. The amorphous alloy electrodes are immersed in hydrofluoric acid. This leads to the accumulation of electrocatalytically active platinum group elements in the electrode surfaces as well as to an increase in the electrochemically effective surface area.

This process, however, suffers from the disadvantage that hydrofluoric acid is highly corrosive and toxic.

The present invention seeks to provide a further process for increasing the active surface area of an electrode by the activation of the electrode surface.

The present invention accordingly provides a process for increasing the active surface area of at least one electrode having a surface comprising a group VIII metal in an electrochemical cell, which also comprises at least one balancing electrode and an aqueous electrolyte which comprises nitrate ions, which comprises applying a sweeping voltage across the electrodes at a rate of at least 0.2 V/s, the sweeping voltage being from a lower voltage which is between the voltage at which hydrogen evolution occurs and −0.7 V to an upper voltage which is between −0.2 V and +0.3 V, all of the above voltages being with reference to a standard calomel reference electrode ($V_{SCE}$).

When the process of the present invention is carried out the electrode produced may, for example, have an effective surface area of at least 250 times the theoretically flat surface area of the electrode. In a preferred embodiment the group VIII metal is rhodium. The preferred alloys are rhodium with platinum and/or palladium.

The present invention further provides the use of a sweeping voltage across electrodes at a rate of at least 0.2 V/s, the sweeping voltage being from a lower voltage which is between the voltage at which hydrogen evolution occurs and −0.7 V to an upper voltage which is between −0.2 V and +0.3 V, all of the above voltages being with reference to a standard calomel reference electrode ($V_{SCE}$), to increase the active surface area of an electrode having a surface comprising a group VIII metal.

Figure 1:
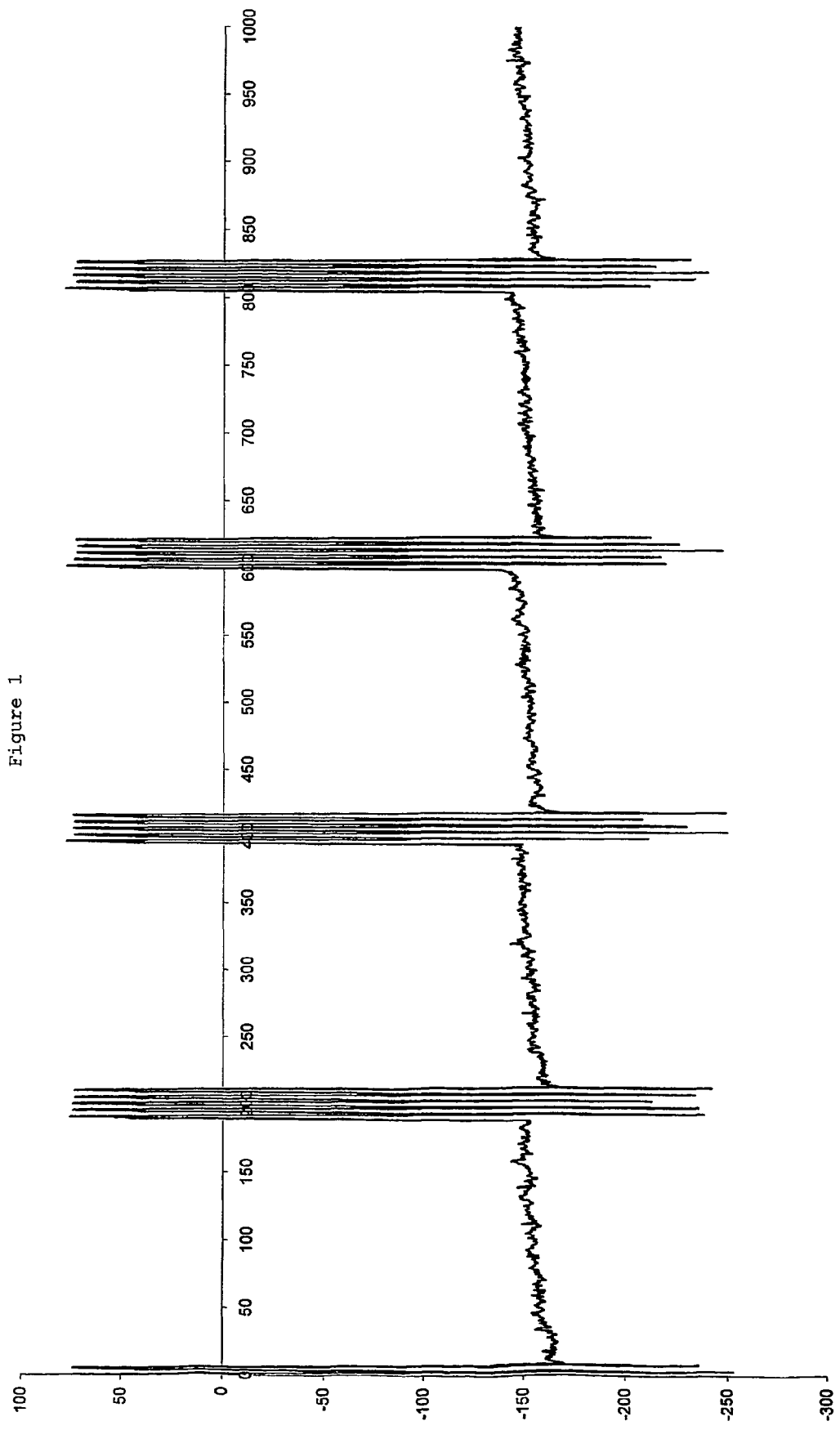
FIG. 1 shows the current passed (mA/cm$^2$) recorded against time (secs) of example 4.

The process of the present invention may be used to activate an electrode before it is used, to maintain the activity of an electrode during its use or after its use, or a combination of any of these.

In the process of the present invention a sweeping voltage is applied across the electrodes in order to activate or regenerate or maintain at least one electrode having a surface comprising a group VIII metal. This sweeping voltage can be applied at any time prior to the use of the electrode, during the use of the electrode or after the electrode has been in use.

All references to applied voltages throughout are with reference to a standard calomel reference electrode ($V_{SCE}$). Desirably, this reference electrode is situated in this electrochemical cell. The electrodes may remain in a cell which is being used, or may be removed and placed in another cell for treatment. The applied voltage is swept at a rate of at least 0.2 V/s, preferably from 0.2 V/s to 0.8 V/s, and most preferably at approximately 0.5 V/s, the sweeping voltage being from a lower voltage which is between the voltage at which hydrogen evolution occurs and −0.7 V to an upper voltage which is between −0.2 V and +0.3 V, and preferably from −1 V to +0.1 V. In a preferred embodiment the sweeping rate is up to 0.8 V/s.

Repeated voltage sweeps effectively increase the active surface area of the group VIII metal. Evidence for this increase in the surface area is provided by what can be termed a "standard scan". A person skilled in the art may use this technique to determine the true measure of the activity of a surface by scanning in a hydroxide solution to eliminate the interfering effects of other ions.

A standard scan of an electrode can be obtained by applying a voltage sweep between a voltage just above that at which hydrogen gas generation occurs and below that at which irreversible oxidation of the surface occurs. From the measured current passed by the electrode, it is possible to determine the number of active sites on the surface of the electrode.

The reformation of the electrode surface is a complex process involving both the active surface metal, preferably rhodium and nitrate ions and other ions which may be present such as halides, preferably chloride and oxygen. During the voltage sweep cycle, the electrode metal surface is subjected to varying electrical potentials which change from oxidative to reductive. During the reductive part of the cycle it is postulated that during the reduction of the nitrate ions one of the oxygen atoms of the nitrate ion occupies a site on the cathode surface. Then, during the oxidative part of the cycle hydroxide and chloride ions, if present, may be involved in the formation of rhodium oxychlorides from which rodium atoms become re-deposited on the rhodium surface during the reductive part of the cycle. This re-deposition process occurs at a voltage which becomes concurrent with that at which any nitrate ions present are reduced causing the developing surface morphology to favour nitrate reduction rather than the competing reaction of hydrogen gas generation. At higher reductive potentials the surface tends to produce hydrogen, which should be avoided. We have found that this complex interaction, occurring during the reductive part of the cycle, deposits the group VIII metal such as rhodium thereby forming a high surface area.

In an embodiment of the invention, said sweeping voltage is applied for a period of at least 5 days, preferably from 5 to 40 days, and most preferably about 30 days, to initially activate the electrode, for example from 5 to 12 days or about 8 days.

The performance of the electrodes can also be maintained by the process of the present invention. Depending on the nature of the solution being treated, the applied voltage may be swept continuously at a rate of at least 0.2 V/s, preferably from 0.2 V/s to 0.8 V/s, and most preferably at approximately 0.5 V/s, the sweeping voltage being from a lower voltage which is between the voltage at which hydrogen evolution occurs and −0.7 V to an upper voltage which is between −0.2 V and +0.3 V, preferably from −1.0 to +0.1 V. Said sweeping voltage may be applied either continuously or at a rate of from 1 to 10 sweep cycle(s) periodically every 10 secs to 5 minutes. Desirably up to 9 complete voltage cycles are applied every approximately 3 minutes, preferably up to 7 cycles, and most preferably approximately 5 or approximately 6 complete voltage cycles are applied every approximately 3 minutes of the cell operation.

A feature of this process is that the surface activity of electrodes of this type can be maintained over extended periods of operation. The continued reconstitution of the active surface can be repeated as a cleaning process, which makes electrodes used in this fashion more resistant to degradation by contamination and by reaction products.

The effective surface area of the electrode having a surface comprising a group VIII metal can be increased to, for example, at least 7 times, preferably 7 to 75 times, and especially 10 to 30 times, more especially 10 to 12 times, the surface area of the electrode prior to being treated. This increase can be achieved even on electroplated group VIII metals, which already have surface areas of 4 to 15 times greater than the theoretical planar surface areas measured by determination of hydrogen adsorption/desorption on the active sites by a standard scan.

The electrochemical cell itself is well known and is described, for example, in U.S. Pat. No. 3,542,657. A further example of an electrochemical cell that can be used is a bipolar cell.

In an electrochemical cell at least one electrode functions as a cathode and at least one electrode functions as an anode. If a plurality of electrodes are present, one side of an intermediate electrode functions as a cathode, whereas the other side functions as an anode. It is essential that at least one of these electrodes has a surface comprising a group VIII metal. This can either be the cathode or the anode. In a preferred embodiment of this invention the electrode having a surface comprising a group VIII metal acts as a cathode. The balancing electrode therefore acts as the anode.

At least one of these electrodes, preferably the cathode, has a surface, which is the active surface area of said electrode, comprising a group VIII metal. Suitable metals are iron, cobalt, nickel, ruthenium, rhodium, palladium, osmium, iridium and platinum, and alloys and mixtures thereof. In a preferred embodiment the group VIII metal which is used is rhodium. The rhodium may be used alone or as an alloy with, for example, platinum and/or palladium.

It is preferred to coat an electrode substrate with a suitable group VIII metal by electroplating. The thickness of the coating is desirably 0.5 μm to 5 μm, preferably 0.5 μm to 1.5 μm, more preferably 0.75 μm to 1.25 μm, and in particular approximately 1 μm.

The electrode substrate may, for example, comprise a metal such as titanium. Furthermore, the electrode substrate may comprise a metal such as titanium coated with, for example, titanium dioxide, ruthenium dioxide, iridium dioxide and/or gold. Many electrode substrates are commercially available.

Desirably all of either the anode or the cathode electrode surfaces, preferably the cathode surfaces, in the electrochemical cell, comprise a group VIII metal. However, this is not an essential feature and only some of either or both of the anode or the cathode surfaces, preferably only the cathode surfaces, need comprise the group VIII metal. Desirably at least 75% and preferably 100% of either or both of the anodes or the cathodes, preferably only the cathodes, comprise a group VIII metal on their surface. Desirably the entire surface of each individual anode or cathode comprises a group VIII metal.

The surface of the electrode desirably consists of or essentially consists of the group VIII metal, although further components or impurities may be present.

The electrochemical cell is suitably operated at an elevated temperature, i.e. at a temperature above room temperature (20° C.). For instance it may be operated at a temperature of from 20° C. to 70° C., preferably at a temperature from 50° C. to 70° C., more preferably at a temperature from 55° C. to 65° C., and most preferably at approximately 60° C.

The balancing electrode, preferably the anode, may be any appropriate electrode. Suitable electrodes are known to those skilled in the art. The electrode surface may be coated with metals or metal oxides. Advantageously, the balancing electrode surface does not comprise a group VIII metal so as to avoid undesirable back reactions.

The electrolyte solution in the electrochemical cell is an aqueous electrolyte comprising at least one compound which allows a current to flow. The electrolyte solution comprises nitrate ions. The solution may, for example, also comprise salts providing anions such as halides (e.g. chloride or bromide), hydroxide, nitrite, sulfate, sulfite, permanganate, perchlorate, chromate, chlorate, acetate, bicarbonate or carbonate. A suitable solution comprises nitrate ions with chloride or hydroxide ions or a mixture thereof. A suitable source of chloride ions is a metal chloride, for example sodium or potassium chloride. A suitable source of hydroxide ions is a metal hydroxide, preferably sodium or potassium hydroxide. A suitable source of nitrate ions is a metal nitrate, preferably sodium or potassium nitrate. A preferred electrolyte solution comprises nitrate ions and both chloride and hydroxide ions.

The electrolyte solution is desirably alkaline.

The electrolyte solution generally comprises up to 5M, especially 1 to 4 M, of the anions. This electrolyte solution preferably comprises up to 0.5 M nitrate ions, preferably up to 0.2 M. It may, for example, also comprise up to 3M chloride ions, preferably up to 2M chloride ions, and may also comprise up to 1M hydroxide ions, preferably up to 0.5M hydroxide ions.

After a period, for example, from 5 to 7 days, of the activation process the molarity of the hydroxide ions in the electrolyte can be reduced, for example, to approximately 0.2M In a preferred embodiment the electrolyte comprises approximately 2M chloride ions, approximately 0.5M hydroxide ions and approximately 0.2M nitrate ions.

The process of the invention can be carried out at lower levels of anions, but the initial activation of the electrode surface will take longer.

The process can be carried out in the absence of nitrate ions, but the initial activation of the electrode surface will also take longer.

Electrodes are used in the treatment of groundwater and, in particular, to the control of nitrate levels in groundwater intended for introduction into the general water supply. Desirably, the electrodes treated by the process of the present invention are used in the electrolysis of water, for example ground or surface water or used ion exchange regenerant, to remove dissolved nitrate ions. For example EP-A291,330 describes a process for treating ground water containing nitrates, which comprises contacting the water with a ion exchange resin and regenerating the resin with a regenerant, wherein the spent regenerant is subjected to electrolysis. The reconstituted regenerant can be then recirculated to the ion-exchange resin. The regenerant may, for example, comprise bicarbonate, chloride or sulphate ions. The electrolysis is carried out in an electrolytic cell containing an anode and a cathode. The nitrogen gas which is evolved can simply pass into the atmosphere. It has been found that electrodes having a surface comprising a group VIII metal can be used in such a process. These electrodes can be activated and maintained by the process of the present invention. The electrodes can be maintained, for example, by sweeping through approximately 5 voltage cycles every approximately 3 minutes, holding the voltage at the required nitrate reduction voltage between the voltage sweeps. The time at which a constant voltage is held and the number of voltage sweeps applied can be varied to optimise the reaction, rate.

The present invention further provides the use of a sweeping voltage across electrodes at a rate of at least 0.2 V/s, the sweeping voltage being from a lower voltage which is between the voltage at which hydrogen evolution occurs and −0.7 V to an upper voltage which is between −0.2 V and +0.3 V, all of the above voltages being with reference to a standard calomel reference electrode ($V_{SCE}$), to produce an electrode surface with reduced activation energy required for the conversion of nitrate ions in aqueous solution to nitrogen gas.

The process reduces the activation energy of nitrate reduction and increases the overpotential required for hydrogen generation. The activated electrode develops a nitrate surface specificity which is reflected in a reduced activation energy for the nitrate destruction process. Activation energy values for the nitrate reduction reaction are derived from Arrhenius plots :–Reaction Rate $(I_{NO3}-)=A_r e^{-EA/RT}$. In particular circumstances, when the process is run to completion, the activation energy is found, for example, to be reduced from at least 50 to 15 kJ/mole and there is a concomitant reduction in the value of the pre-exponential constant ($A_r$) which is reduced, for example, by up to 5 orders of magnitude.

The present invention is further described in the following Examples.

EXAMPLES

All the voltages in the Examples are with reference to a standard calomel reference electrode ($V_{SCE}$)

Example 1

A simple electrochemical cell was constructed from a plastic sheet having internal dimensions of 40 cm (length), 29 cm (width) and 25 cm (height). The working volume, i.e. liquid volume, was 23 litres.

The cells were fitted with an electrode at either end and a direct current power supply was connected. In addition up to 30 intermediary electrodes of various widths and lengths with small slots about 0.5 cm deep along one side only could be fitted between the end electrodes by placing them in slots in the side plates of the cell. The electrodes were arranged so that the slots opposed each other between adjacent electrodes. No direct electrical connection was made to these electrodes.

The cell was fitted with a lid and operated at a constant liquid volume by periodically venting gas produced at the electrodes through a gas valve. This was directly linked to a liquid level switch giving automatic level control. The liquid level was maintained below the top of the intermediary electrodes. Liquid was pumped into the cell at one end of the cell and pushed out of the cell at the opposite end of the cell.

The cell was fitted with 30×1.5 mm thick commercial titanium electrodes sized 300×200 mm electrolytically coated on the cathode surfaces with a 0.75 μm thick coating of rhodium and on the anode surfaces with a mixed coating of titanium oxide and ruthenium oxide. The electrolyte used was 2 M potassium chloride solution which had been used to regenerate a nitrate selective anion exchange column. The column had been fully loaded with nitrate ions. Therefore nitrate ions were also present in the electrolyte solution. Prior to processing in the electrochemical cell the pH of this solution was adjusted to greater than 13.5 by the addition of 6M potassium hydroxide. After treatment in the electrochemical cell, the pH of the solution was adjusted to about 7 by the addition of 37% wt hydrochloric acid. As a comparative test, the cathode potential was held at −0.96 V for a period of 8 hours and no sweeps were applied. The experiment was then repeated, but the cathode potential was varied, in accordance with the present invention, 5 times in quick succession every 3 minutes, where the sweeping voltage was applied from −1.0 to +0.1 V, at a rate of 0.5 V/s, with the cathode potential held at −0.96 V between sweeps.

Table 1 shows nitrate destruction rates and power costs for the electrochemical cell. The effect of regularly applying the voltage sweeps can be clearly seen by the increase in nitrate reduction rates and decrease in electrical energy used to reduce the nitrate.

TABLE 1

|  | Sweep | No sweep (mean over 8 hour period) |
|---|---|---|
| NO₃ destruction rate | 60 g/h | 20 g/h |
| Power costs | 9 Wh/g | 25 Wh/g |

Example 2

In a simple polypropylene cell comprising 1 anode and 1 cathode having the same dimensions as in Example 1 were spaced 2 cm apart. The anode was of titanium sheet sized 200×300 mm electrolytically coated on the surfaces with a mixture of ruthenium oxide and titanium oxide and the cathode was of titanium sheet electrolytically coated on the surfaces with a 0.75 μm thick coating of rhodium. The electrolyte consisted of a 2 M potassium chloride, 0.5 M potassium hydroxide and 0.2 M potassium nitrate solution. This solution was circulated through the cell and through a heat exchanger to maintain operational temperature. The voltage applied to the cell was continually swept from −1.0 to +0.1 V at a rate of 0.5 V/s.

The nitrate reduction power costs, reduction rates and the effect of varying the operational temperature are shown in Table 2. Although the lowest nitrate reduction power costs are observed at lower temperatures, the reduction rate is significantly lower. For a practical application, it is acceptable to have higher costs for a greater nitrate reduction rate.

TABLE 2

| Expt. | Temp (° C.) | Power consumption/g NO$_3$ reduced (Wh/g) | Rate of NO$_3$ reduction (g/m$^3$/h) |
|---|---|---|---|
| 1 | 40 | 6.2 | 6.2 |
| 2 | 55 | 7.8 | 16 |
| 3 | 60 | 8.9 | 19 |

Example 3

A polypropylene beaker was used as a cell and was fitted with an anode of titanium sheet sized 100×30 mm coated on the surfaces with a mixture of ruthenium oxide and titanium oxide and a cathode of titanium wire 1.5 mm in diameter electrolytically coated on the surfaces with a 1.0 μm thick coating of rhodium and immersed to a depth of 20 mm into the electrolyte. The electrolyte consisted of a 2 M potassium chloride, 0.5 M potassium hydroxide and 0.2 M potassium nitrate solution. This solution was held in a water bath to maintain operational temperature. The voltage applied to the cell was continually swept from −1.0 to +0.1 V at a rate of 0.5 V/s.

The cathode was periodically removed from the electrolyte and a standard scan recorded and used to determine the active surface area of the electrode.

Table 3 shows the effective increase in active surface area of the electrode.

TABLE 3

Area Factor Increase on Wire Electrode

| Rhodium Surface | Treatment (in 0.5M KOH/2M KCl/0.2M KNO$_3$) | Area Factor |
|---|---|---|
| As received (electro-plated) | Wash in de-ionised water | 20 to 40 |
| Treated | After 1 hour @ 500 mV/sec; 60° C. | 50 to 60 |
| Treated | After 5 days @ 500 mV/sec; 60° C. | 200 |
| Treated | After 10 days @ 500 mV/sec; 60° C. | 280 to 300 |

Example 4

The Experiment detailed in Example 3 was duplicated except that after the electrode had been activated, it was immersed to a depth of 20 mm into the electrolyte. In this experiment, the cathode voltage was repeatedly held at −0.96 V for 3 minutes, then cycled 5 times from −1.025 to +0.1 V at a rate of 0.5 V/s.

The current passed (mA/cm$^2$) was recorded against time (secs) and is shown in FIG. 1. The 5 voltage sweeps from −1.025 to +0.1 V at a rate of 0.5 V/s every 3 minutes are indicated by the rapid current fluctuations associated with change in applied voltage. When the applied voltage was maintained at −0.96 V for 3 minutes, the current passed reduces with time. This is associated with temporary blocking of active sites by reaction products or competing ions.

The current increases with each successive 5 cycle sweep, showing the activation process taking place.

The activity of the surfaces is restored by sweeping the voltage over the described range.

Example 5

The Experiment detailed in Example 4 was duplicated except that the cathode did not have any initial activation treatment. Instead it was rinsed in deionised water and air dried.

Figure 2:
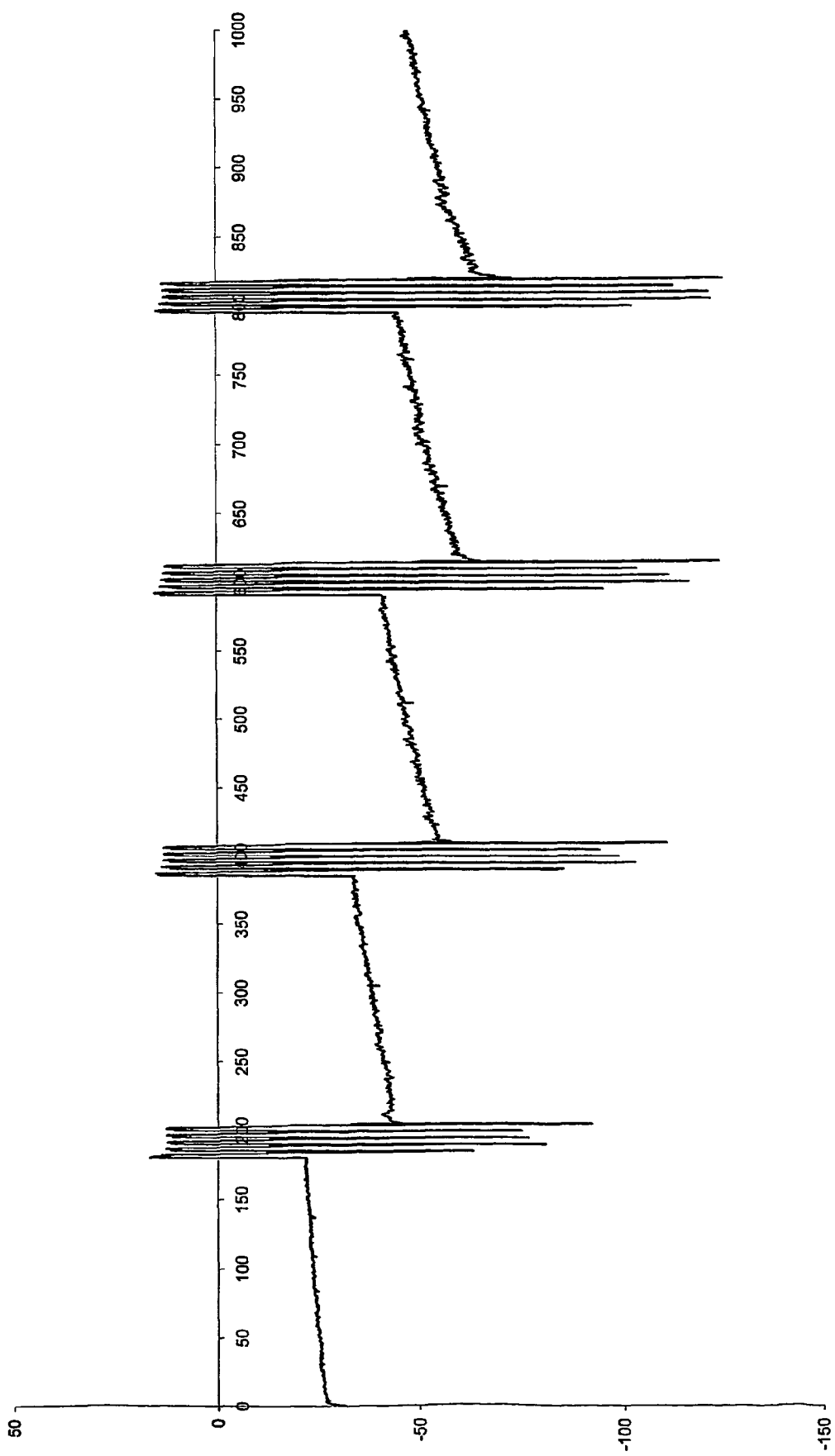
FIG. 2 shows the current passed (mA/cm$^2$) recorded against time (secs) of example 5.

The current passed (mA/cm$^2$) was recorded against time (secs) and is shown in FIG. 2. The 5 voltage sweeps from −1.025 to +0.1 V at a rate of 0.5 V/s every 3 minutes are indicated by the rapid current fluctuations associated with change in applied voltage. When the applied voltage was maintained at −0.96 V for 3 minutes the current passed reduced with time. The plot of current against time shows a significantly lower current.

The current increases with each successive 5 cycle sweep, again showing the activation taking place. The decrease in current with time is greater than with an activated electrode, although a benefit is still seen.

The invention claimed is:

1. A process for increasing the active surface area of at least one electrode, acting as a cathode, having a surface comprising rhodium in an electrochemical cell, which also comprises at least one balancing electrode and an aqueous alkaline electrolyte which comprises nitrate ions and halide ions; which comprises applying a sweeping voltage across the electrodes at a rate of at least 0.2 V/s, the sweeping voltage being from a lower voltage which is between the voltage at which hydrogen evolution occurs and −0.7 V to an upper voltage which is between −0.2 V and +0.3 V, all of the above voltages being with reference to a standard calomel reference electrode ($V_{SCE}$), wherein the activated electrode converts nitrate ions in the electrolyte solution to nitrogen gas and wherein the sweeping voltage is applied either continuously or at a rate of from 1 to 10 sweep cycles even 10 seconds to 5 minutes to maintain the activity of the activated electrode.

2. A process according to claim 1 wherein the electrochemical cell is operated at a temperature of from 50 to 70° C.

3. A process according to claim 1 wherein the sweeping rate is up to 0.8 V/s.

4. A process according to claim 1 wherein the halide ion is chloride.

5. A process according to claim 1 wherein the electrolyte comprises chloride ions and hydroxide ions.

6. A process according to claim 5 wherein the electrolyte comprises up to 3 M chloride ions and up to 1 M hydroxide ions.

7. A process according to claim 6 wherein the electrolyte comprises approximately 2M chloride ions, approximately 0.5M hydroxide ions, and approximately 0.2M nitrate ions.

8. A process according to claim 5 wherein after a period of from 5 to 7 days the hydroxide molarity in the electrolyte is reduced to approximately 0.2M.

9. A process according to claim 1 wherein the electrolyte comprises up to 0.5 M nitrate ions.

10. A process according to claim 1 wherein said sweeping voltage is applied for a period of at least five days to initially activate the electrode.

11. A process according to claim 1 wherein approximately 6 complete voltage cycles are applied every approximately 3 minutes.

12. A process according to claim 1 wherein the active surface area of the electrode having a surface comprising rhodium is increased to at least 7 times the surface area of the electrode prior to being treated.

13. A process according to claim 1 wherein the activated electrode is used in the electrolysis of aqueous solutions to remove dissolved nitrate tons.

14. A process according to claim 1 wherein said process produces an electrode surface with reduced actiation energy required for the conversion of nitrate ions in aqueous solution to nitrogen gas.

\* \* \* \* \*